(12) United States Patent
Ogiso et al.

(10) Patent No.: US 12,257,869 B2
(45) Date of Patent: Mar. 25, 2025

(54) SPRING

(71) Applicant: CHUO HATSUJO KABUSHIKI KAISHA, Nagoya (JP)

(72) Inventors: Hiroyuki Ogiso, Nagoya (JP); Kazuyoshi Nono, Nagoya (JP); Hideo Yamashita, Nagoya (JP); Yuichi Nakazawa, Nagoya (JP)

(73) Assignee: CHUO HATSUJO KABUSHIKI KAISHA, Nagoya (JP)

( * ) Notice: Subject to any disclaimer, the term of this patent is extended or adjusted under 35 U.S.C. 154(b) by 560 days.

(21) Appl. No.: 16/976,763

(22) PCT Filed: Mar. 6, 2019

(86) PCT No.: PCT/JP2019/008917
§ 371 (c)(1),
(2) Date: Aug. 31, 2020

(87) PCT Pub. No.: WO2019/172327
PCT Pub. Date: Sep. 12, 2019

(65) Prior Publication Data
US 2020/0406698 A1 Dec. 31, 2020

(30) Foreign Application Priority Data

Mar. 7, 2018 (JP) .................................. 2018-040752
Mar. 7, 2018 (JP) .................................. 2018-040753

(51) Int. Cl.
*B60G 11/52* (2006.01)
*F16F 1/12* (2006.01)
*F16F 3/12* (2006.01)

(52) U.S. Cl.
CPC ................ *B60G 11/52* (2013.01); *F16F 1/12* (2013.01); *F16F 3/12* (2013.01); *B60G 2206/42* (2013.01);
(Continued)

(58) Field of Classification Search
CPC ................ B60G 11/52; B60G 2206/42; B60G 2206/70; B60G 2206/724; B60G 2206/73;
(Continued)

(56) References Cited

U.S. PATENT DOCUMENTS 2,126,707 A * 8/1938 Schmidt ................ F16F 1/3814
267/141.1
2,605,099 A * 7/1952 Brown ...................... F16F 3/12
220/666
(Continued)

FOREIGN PATENT DOCUMENTS

CN 2011069446 A 4/2011
CN 102474688 A 5/2012
(Continued)

OTHER PUBLICATIONS

International Search Report and Written Opinion for International application No. PCT/JP2019/008917, May 7, 2019, ISA/JP.

*Primary Examiner* — Bradley T King
*Assistant Examiner* — James K Hsiao
(74) *Attorney, Agent, or Firm* — ArentFox Schiff LLP

(57) ABSTRACT

This spring used for a suspension device for a vehicle is provided with: a metal wire material which constitutes a spring section and which has a cover layer provided on the surface thereof; and a seat section which is subjected to a load acting on the spring section, is formed from an elastically deformable material, and is bonded to the cover layer by an adhesive. The difference between the hardness of the seat section and the hardness of the adhesive is greater than the difference between the hardness of the adhesive and the hardness of the cover layer.

8 Claims, 3 Drawing Sheets

(52) U.S. Cl.
CPC .... *B60G 2206/70* (2013.01); *B60G 2206/724* (2013.01); *B60G 2206/73* (2013.01); *B60G 2206/821* (2013.01); *B60G 2800/162* (2013.01); *F16F 2224/02* (2013.01); *F16F 2224/0208* (2013.01); *F16F 2224/025* (2013.01); *F16F 2226/042* (2013.01); *F16F 2230/0005* (2013.01); *F16F 2232/08* (2013.01)

(58) Field of Classification Search
CPC ......... B60G 2206/821; B60G 2800/162; F16F 1/12; F16F 3/12; F16F 2224/02; F16F 2224/0208; F16F 2224/025; F16F 2226/042; F16F 2230/0005; F16F 2232/08
See application file for complete search history.

(56) References Cited

U.S. PATENT DOCUMENTS

| | | | | |
|---|---|---|---|---|
| 3,761,069 | A * | 9/1973 | Moore | A61M 5/1415 267/152 |
| 3,939,674 | A * | 2/1976 | Czech | F16F 3/12 68/23.3 |
| 4,172,590 | A * | 10/1979 | Jarret | F16F 3/12 267/152 |
| 4,595,445 | A * | 6/1986 | Hombach | C08G 18/5048 156/308.2 |
| 4,732,372 | A * | 3/1988 | Dickhart, III | B60G 11/16 267/287 |
| 4,763,882 | A * | 8/1988 | Nishiyama | F16F 3/12 267/152 |
| 4,771,996 | A * | 9/1988 | Martinez, Jr. | F16F 9/58 267/153 |
| 4,779,850 | A * | 10/1988 | Paton | B60G 11/54 267/292 |
| 4,817,921 | A * | 4/1989 | Stevenson | F16F 3/12 280/124.179 |
| 4,869,471 | A * | 9/1989 | Schwarz | F16F 1/024 267/180 |
| 4,874,154 | A * | 10/1989 | Zimbone | F16F 3/12 267/140.4 |
| 4,886,256 | A * | 12/1989 | Nishiyama | B60G 15/07 267/221 |
| 5,203,849 | A * | 4/1993 | Balsells | F16F 3/12 267/1.5 |
| 5,213,315 | A * | 5/1993 | Hartel | F16F 3/087 267/153 |
| 5,421,565 | A * | 6/1995 | Harkrader | B60G 11/16 267/221 |
| 5,984,283 | A * | 11/1999 | Tsuiki | F16F 3/093 267/140.3 |
| 6,126,155 | A * | 10/2000 | Smith | B60G 15/067 267/293 |
| 6,179,309 | B1 * | 1/2001 | Satou | B60G 3/20 280/124.179 |
| 6,237,901 | B1 * | 5/2001 | Bianchi | B60G 17/02 267/286 |
| 6,260,836 | B1 * | 7/2001 | Aoyama | B60G 15/063 267/221 |
| 7,806,392 | B2 * | 10/2010 | Ishikawa | B60G 15/068 267/221 |
| 9,234,555 | B2 * | 1/2016 | Nakamura | F16F 1/122 |
| 9,334,913 | B2 * | 5/2016 | Schüssler | B60G 11/14 |
| 9,777,787 | B2 * | 10/2017 | Teichmann | B29C 65/48 |
| 9,895,948 | B2 * | 2/2018 | Paulding | B60G 11/52 |
| 10,704,634 | B2 | 7/2020 | Ohmura et al. | |
| 10,899,188 | B2 * | 1/2021 | Okura | F16F 1/123 |
| 2008/0224371 | A1 * | 9/2008 | Brand | B60G 15/063 267/221 |
| 2009/0212476 | A1 * | 8/2009 | Knebel, III | F16F 1/043 83/13 |
| 2010/0009086 | A1 * | 1/2010 | Tran | B05D 7/146 523/400 |
| 2010/0014792 | A1 * | 1/2010 | Kellam | B60G 15/067 384/196 |
| 2010/0289199 | A1 * | 11/2010 | Lee | B60G 11/16 267/286 |
| 2011/0140327 | A1 * | 6/2011 | Imaizumi | F01L 3/10 267/174 |
| 2014/0117597 | A1 * | 5/2014 | Fujimoto | F16F 13/002 267/35 |
| 2014/0225319 | A1 * | 8/2014 | Schussler | B60G 15/062 156/60 |
| 2014/0232084 | A1 * | 8/2014 | Suzuki | B60G 9/00 280/124.179 |
| 2016/0016342 | A1 * | 1/2016 | Al-Dahhan | B29C 45/14311 264/162 |
| 2016/0052358 | A1 * | 2/2016 | Itsuji | B60G 11/52 267/33 |
| 2016/0333956 | A1 * | 11/2016 | Teichmann | F16F 1/06 |
| 2017/0015028 | A1 * | 1/2017 | Lee | C08L 75/04 |
| 2017/0015171 | A1 * | 1/2017 | Enomoto | B60G 11/52 |
| 2018/0326450 | A1 * | 11/2018 | Yamashita | B32B 5/16 |
| 2018/0340586 | A1 * | 11/2018 | Koba | F16F 1/3828 |
| 2018/0361424 | A1 * | 12/2018 | Koyama | F16F 1/06 |
| 2018/0362698 | A1 * | 12/2018 | Joo | C08G 18/7678 |
| 2019/0107165 | A1 * | 4/2019 | Okamoto | F16F 1/12 |
| 2019/0152361 | A1 * | 5/2019 | Matsushita | B60G 11/16 |
| 2019/0160906 | A1 * | 5/2019 | Umeno | B60G 11/14 |
| 2019/0275634 | A1 * | 9/2019 | White | B25J 9/0009 |
| 2020/0391565 | A1 * | 12/2020 | Ogiso | F16F 1/12 |
| 2020/0400205 | A1 * | 12/2020 | Ogiso | F16F 1/126 |
| 2021/0316587 | A1 * | 10/2021 | Shibata | B60G 11/16 |
| 2021/0339592 | A1 * | 11/2021 | Shibata | B60G 11/52 |

FOREIGN PATENT DOCUMENTS

| | | |
|---|---|---|
| CN | 103299079 A | 9/2013 |
| CN | 104235246 A | 12/2014 |
| CN | 105383253 A | 3/2016 |
| CN | 105420670 A | 3/2016 |
| CN | 106151365 A | 11/2016 |
| JP | 11117982 A | 4/1999 |
| JP | 2015-190538 A | 11/2015 |
| JP | 2016056895 A | 4/2016 |
| JP | 2017-15249 A | 1/2017 |

* cited by examiner

SPRING

CROSS-REFERENCE TO RELATED APPLICATIONS

This application is a 371 U.S. national stage of PCT/JP2019/008917, filed Mar. 6, 2019, which claims priority to Japanese Patent Application No. 2018-40752 and Japanese Patent Application No. 2018-40753 filed with the Japan Patent Office on Mar. 7, 2018, and contents of each of which are incorporated herein by reference in their entireties.

BACKGROUND OF THE INVENTION

Technical Field

The present disclosure relates to a spring, and in particular to a spring that can be used in a suspension device such as a suspension device for a vehicle.

Background Art

For example, in a spring device of an invention described in Patent Document 1, a coil spring made of metal and a holding member made of plastic are adhered to each other via an adhesive, and the hardness of the adhesive is lower than the hardness of a coating layer of the wire.

PRIOR ART DOCUMENT

Patent Document

Patent Document 1: Japanese Patent Publication No. 2017-15249

SUMMARY OF THE INVENTION

Problems to be Solved by the Invention

In the spring device described in Patent Document 1, the coil spring may be damaged early for the following reasons.

In other words, in the spring device described in Patent Document 1, the load energy is partially absorbed by the adhesive by reducing the hardness of the adhesive. Therefore, the adhesive may peel off from the boundary surface between the adhesive and the coating layer due to perennial load.

If the adhesive peels off from the boundary surface between the adhesive and the coating layer, due to a change in the load, the adhesive is brought into contact with the coating layer in such a manner as to rub against the coating layer, and therefore the coating layer may be damaged early. If the coating layer is damaged, the wire made of metal may be damaged early, and therefore the coil spring may be damaged early.

In view of the above points, the present disclosure discloses an example of a spring capable of suppressing early damage of a spring section constituted by a wire made of metal.

Means for Solving the Problems

A spring for a suspension device for a vehicle according to an aspect of the present disclosure comprises: a wire made of metal, constituting a spring section, and provided with a coating layer on its surface; and a seat section made of an elastically deformable material, configured to bear load acting on the spring section, and adhered to the coating layer by an adhesive. Moreover, it is preferable that the difference between the hardness of the seat section and the hardness of the adhesive is greater than the difference between the hardness of the adhesive and the hardness of the coating layer.

Peeling is more likely to occur at a boundary surface with a greater hardness difference. Therefore, in the spring for a suspension device for a vehicle according to the aspect described above, peeling is more likely to occur at the boundary surface between the seat section and the adhesive than at the boundary surface between the adhesive and the coating layer. Therefore, the coating layer can be maintained in a state of being covered with the adhesive, and thus early damage of the coating layer can be suppressed.

Hence, the wire made of metal can be suppressed from being damaged early, and therefore early damage of the spring section can be suppressed.

DETAILED DESCRIPTION OF EMBODIMENTS

Figure 1:
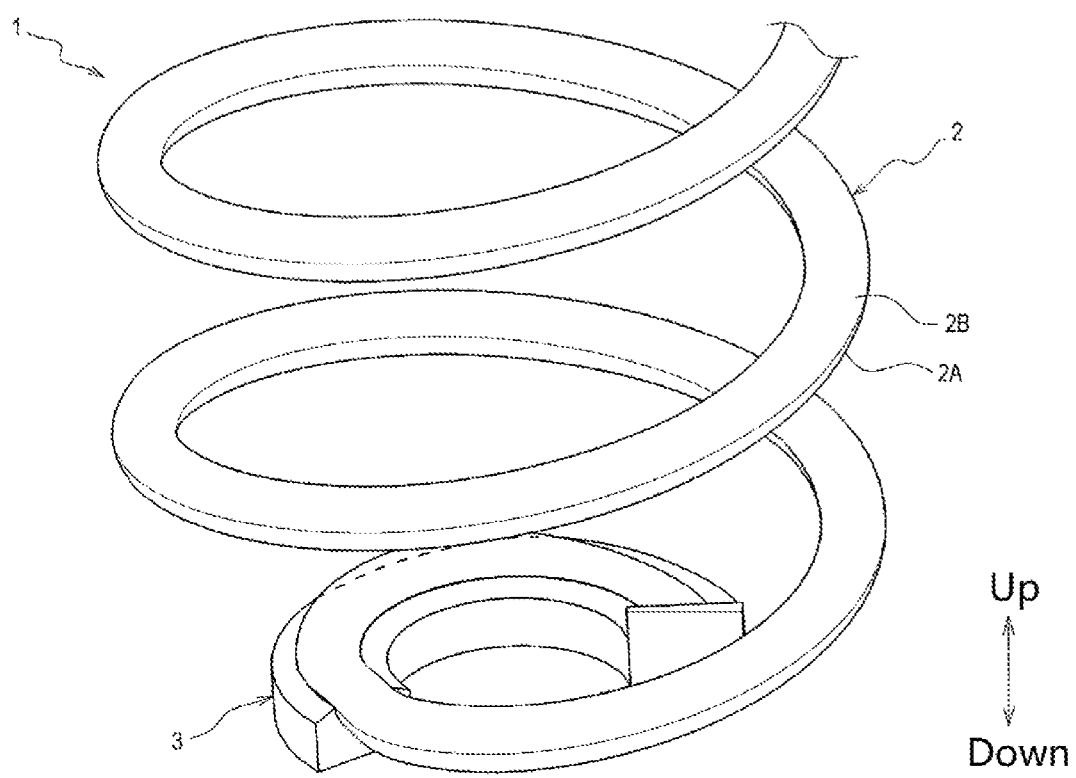
FIG. 1 is a diagram showing a spring according to an embodiment of the invention.

The following "embodiment of the invention" shows an example of an embodiment falling within the technical scope of the present disclosure. In other words, the invention-specifying matters recited in the claims are not limited by specific configurations, structures, or the like shown in the following embodiments.

Arrows or the like indicating directions marked in the drawings are described to provide easy understanding of the relationships among the drawings. The invention described in this specification is not limited by the directions marked in the drawings.

At least a member or portion described with a reference numeral is provided at least one in number unless specified with the term "one" or the like. In other words, two or more such members may be provided when not specified with the term "one" or the like.

This embodiment is an example in which the spring of the present disclosure is applicable as a spring for a suspension device, such as a spring for a suspension device for a vehicle.

First Embodiment

1. Configuration of Spring for Suspension Device

A spring 1 for a suspension device shown in FIG. 1 (hereinafter referred to as a spring 1) comprises at least a spring section 2 and a seat section 3. The spring section 2 is a spring constituted by a wire 2A made of metal.

A coating layer 2B covering the entire wire 2A is provided on the surface of the wire 2A. The spring section 2 of this embodiment is a coil spring formed in a coil shape. The coating layer 2B is a thin film formed by painting and baking a resin such as a thermosetting resin.

Figure 2:
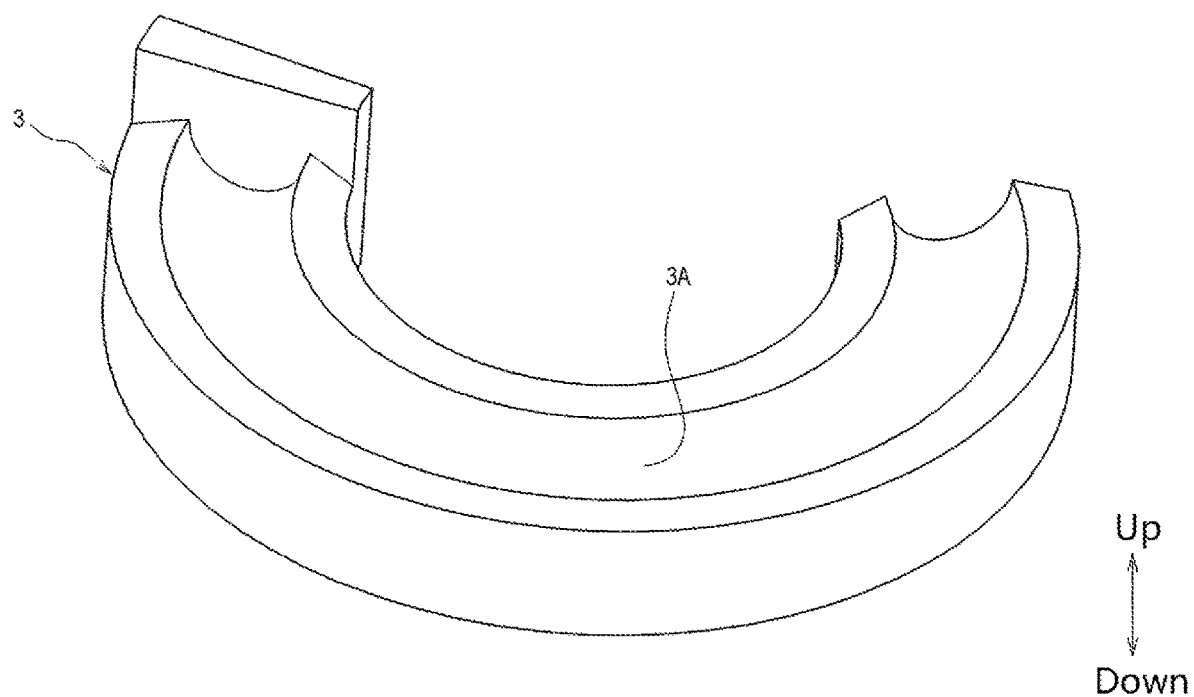
FIG. 2 is a diagram showing a seat section in an embodiment.

The seat section 3 is a seat bearing load acting on the spring section 2, and is, for example, a rubber seat. The seat section 3 is made of an elastically deformable material. The material of the seat section 3 may exemplarily include at least one of rubber and resin. As shown in FIG. 2, the seat section 3 is provided with a groove section 3A into which a portion of the wire 2A is fitted/embedded.

The groove section 3A is a groove into which a portion of the wire 2A constituting an end turn section is fitted. In other words, the seat section 3 is arranged at an end side of the spring section 2 in a coil shape in the coil axial direction, and is in contact with the portion of the wire 2A constituting the end turn section (see FIG. 1). The wire 2A described below is the portion of the wire 2A constituting the end turn section.

Figure 3:
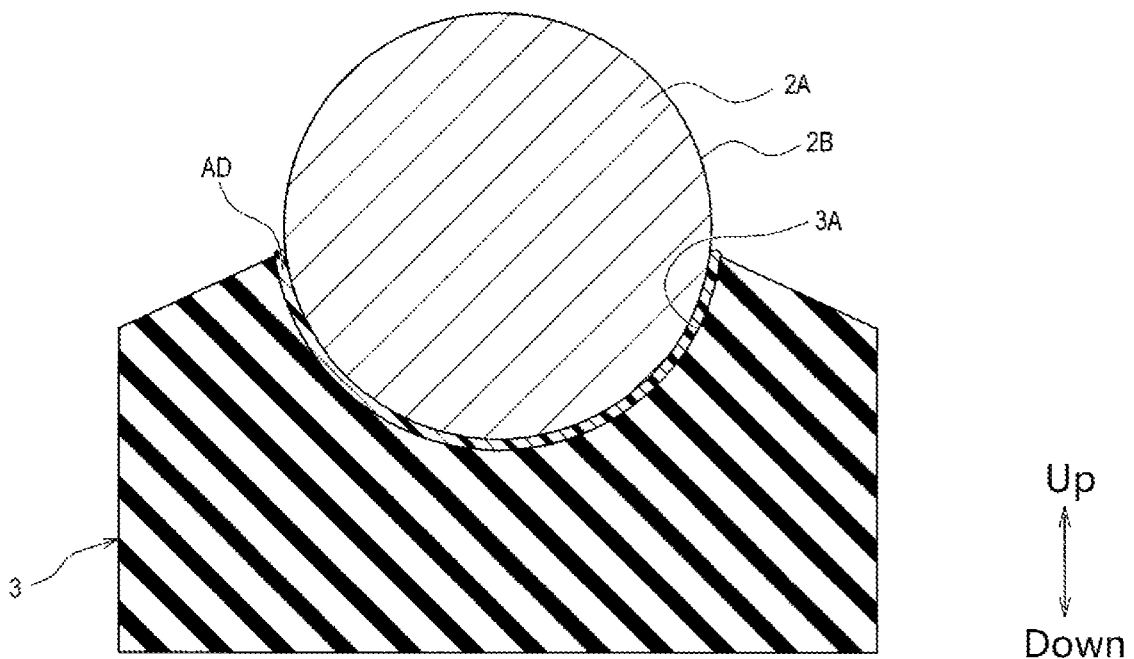
FIG. 3 is a diagram showing an adhesion layer and its vicinity in an embodiment.

The wire 2A is adhered by an adhesive to the inner wall surface of the seat section 3, i.e., the groove section 3A. Therefore, as shown in FIG. 3, an adhesion layer AD of the adhesive is formed between the wire 2A and the inner wall surface of the groove section 3A.

2. Structure of an Adhesion Part

In this embodiment, as the adhesive, an adhesive is used such that the difference between the hardness of the seat section 3 and the hardness of the adhesive (the adhesion layer AD) is greater than the difference between the hardness of the adhesive (the adhesion layer AD) and the hardness of the coating layer 2B.

Specifically, the adhesive is an adhesive with excellent weather resistance (for example, an epoxy-based adhesive). The seat section 3 is made of a rubber such as a natural rubber. The coating layer 2B is made of an epoxy-polyester-based resin. The adhesion layer AD of this adhesive has a thickness of about 1 mm. The coating layer 2B has a thickness of about 40 µm or more.

The hardness of the adhesive (the adhesion layer AD) is the hardness obtained when the adhesive has been fully hardened. Specifically, for example, in the case of the adhesive of this embodiment, the hardness is that obtained after the adhesive has been kept at room temperature for about 8 hours, or after the adhesive is heated in a furnace at 100° C. for about 20 minutes.

3. Features of the Spring of this Embodiment

Generally, peeling is more likely to occur at a boundary surface with a greater hardness difference. Therefore, for the spring 1 of this embodiment, peeling is more likely to occur at the boundary surface between the seat section 3 and the adhesion layer AD than at the boundary surface between the adhesion layer AD and the coating layer 2B.

Therefore, even in the case where peeling occurs at the adhesion layer AD, the coating layer 2B can be maintained in a state of being covered with the adhesion layer AD, and thus early damage of the coating layer 2B can be prevented. Hence, the wire 2A made of metal can be prevented from being damaged early, and therefore early damage of the spring section 2 can be prevented.

Other Embodiments

In the above embodiment, the adhesive is an epoxy-based adhesive, the seat section 3 is made of a rubber such as a natural rubber, and the coating layer 2B is made of an epoxy-polyester-based resin. However, the invention disclosed in the specification of the present disclosure is not limited thereto.

In other words, in this invention, the specific materials may be materials other than those described above, provided that the difference between the hardness of the seat section 3 and the hardness of the adhesive (the adhesion layer AD) is greater than the difference between the hardness of the adhesive (the adhesion layer AD) and the hardness of the coating layer 2B.

Furthermore, the present disclosure is not limited to the above embodiments, without departing from the gist of the invention recited in the claims. Therefore, at least two of the above multiple embodiments may be combined. Furthermore, the present disclosure is also applicable to springs other than the spring for a suspension device.

What is claimed is:

1. A spring for a suspension device, configured to be used in a suspension device for a vehicle, comprising:
    a wire made of metal, constituting a spring section, and provided with a coating layer on a surface of the wire; and
    an adhesion layer comprising an adhesive;
    a seat section made of an elastically deformable material, configured to bear load acting on the spring section, and adhered to the coating layer by the adhesive;
    wherein the adhesion layer of the adhesive has a thickness dimension of 1 mm, and the coating layer has a thickness dimension of about 40 µm,
        wherein a difference between a hardness of the seat section and a hardness of the adhesive is greater than a difference between the hardness of the adhesive and a hardness of the coating layer; peeling is more likely to occur at a boundary surface between the seat section and the adhesion layer than at a boundary surface between the adhesion layer and the coating layer.

2. The spring for a suspension device according to claim 1, wherein the spring section is a coil spring, and the seat section is adhered to an end turn section of the spring section.

3. The spring for a suspension device according to claim 2, wherein a material of the seat section comprises rubber.

4. The spring for a suspension device according to claim 2, wherein a material of the seat section comprises resin.

5. The spring for a suspension device according to claim 1, wherein a material of the seat section comprises rubber.

6. The spring for a suspension device according to claim 5, wherein a material of the seat section comprises resin.

7. The spring for a suspension device according to claim 1, wherein a material of the seat section comprises resin.

8. The spring for a suspension device according to claim 1,
    wherein the hardness of the adhesive is obtained after the adhesive is kept for 8 hours at a room temperature, or the hardness of the adhesive is obtained after the adhesive is heated in a furnace at 100° C. for 20 minutes.

* * * * *